United States Patent
Sato et al.

(10) Patent No.: US 7,626,300 B2
(45) Date of Patent: Dec. 1, 2009

(54) RADIAL ANISOTROPIC CYLINDRICAL SINTERED MAGNET AND PERMANENT MAGNET MOTOR

(75) Inventors: Koji Sato, Echizen (JP); Takehisa Minowa, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 339 days.

(21) Appl. No.: 10/589,235

(22) PCT Filed: Jun. 20, 2005

(86) PCT No.: PCT/JP2005/011242

§ 371 (c)(1), (2), (4) Date: Aug. 14, 2006

(87) PCT Pub. No.: WO2005/124796

PCT Pub. Date: Dec. 29, 2005

(65) Prior Publication Data

US 2007/0170801 A1 Jul. 26, 2007

(30) Foreign Application Priority Data

Jun. 22, 2004 (JP) ............................. 2004-183214

(51) Int. Cl.
H02K 21/12 (2006.01)
(52) U.S. Cl. ............................ 310/156.43; 310/156.45; 310/156.47
(58) Field of Classification Search ............ 310/156.43, 310/156.45, 156.47, 154.22, 154.28, 154.29; 148/302, 100; 335/284; 29/598
See application file for complete search history.

(56) References Cited

U.S. PATENT DOCUMENTS 4,004,167 A * 1/1977 Meckling ............... 310/154.25

(Continued)

FOREIGN PATENT DOCUMENTS

EP 1263116 A2 12/2002

(Continued)

OTHER PUBLICATIONS

European Search Report dated Nov. 6, 2007 issued in corresponding European Application No. 05 75 1118.

(Continued)

*Primary Examiner*—Dang D Le
(74) *Attorney, Agent, or Firm*—Westerman, Hattori, Daniels & Adrian, LLP (57) ABSTRACT

In a radially anisotropic sintered magnet of annular shape, the remanence in a radial direction of the annulus increases and decreases at intervals of 90° in a circumferential direction of the annulus, and the remanence in a radial direction over the entire circumference of the annulus has a maximum of 0.95-1.60 T and a minimum equal to 50-95% of the maximum. In a permanent magnet motor comprising a plurality of stator teeth, the radially anisotropic annular sintered magnet is incorporated after it is magnetized in 4n poles (wherein n is an integer of 1 to 20) so that the boundary between N and S poles is located within the range that is centered at the radial direction where the remanence exhibits the minimum and extends ±10° therefrom in a circumferential direction. The radially anisotropic annular sintered magnet undergoes neither fracture nor cracking during the sintering and aging/cooling steps even when it is shaped to a low inner/outer diameter ratio and has satisfactory magnetic properties. A permanent magnet motor comprising the radially anisotropic annular sintered magnet is inexpensive and of high performance.

5 Claims, 7 Drawing Sheets

U.S. PATENT DOCUMENTS

| | | | |
|---|---|---|---|
| 5,841,212 A * | 11/1998 | Mita et al. | 310/156.56 |
| 6,262,507 B1 | 7/2001 | Sato et al. | |
| 6,657,349 B2 * | 12/2003 | Fukushima | 310/156.47 |
| 2002/0047431 A1 | 4/2002 | Fukushima | |
| 2002/0180294 A1 | 12/2002 | Kaneda et al. | |
| 2002/0180295 A1 | 12/2002 | Kaneda et al. | |

FOREIGN PATENT DOCUMENTS

| | | |
|---|---|---|
| EP | 1 308 970 A2 | 5/2003 |
| EP | 0996216 B1 | 2/2004 |
| JP | 11-204318 A | 7/1999 |
| JP | 2000-116090 A | 4/2000 |
| JP | 3182979 B2 | 7/2001 |
| JP | 2002-354721 A | 12/2002 |
| JP | 2004-111944 A | 4/2004 |

OTHER PUBLICATIONS

Notification of Transmittal of Copies of Translation of the International Preliminary Report on Patentability (Form PCT/IB/338) of International Application No. PCT/JP2005/011242 mailed Jan. 11, 2007 with Forms PCT/IB/373 and PCT/ISA/237.

Motohara Shimizu et al., "Anisotropic Ring Shape Sintered Nd-Fe-B Magnets", Hitachi Metals Technical Report, vol. 6, pp. 33-36, 1985.

F. Kools, "Complications in Firing oriented Hexaferrites due to Anisotropic Effects Cracking of Radially Oriented rings during firing", Science of Ceramics, vol. 7(1973), pp. 29-45.

International Search Report of PCT/JP2005/011242 date of mailing Aug. 23, 2005.

* cited by examiner

RADIAL ANISOTROPIC CYLINDRICAL SINTERED MAGNET AND PERMANENT MAGNET MOTOR

TECHNICAL FIELD

This invention relates to radially anisotropic annular sintered magnets and permanent magnet motors.

BACKGROUND ART

Anisotropic magnets produced by milling magnetocrystalline anisotropy materials such as ferrites or rare-earth alloys and pressing the milled magnetic material in a specific magnetic field are widely used in speakers, motors, measuring instruments and other electrical devices. Of these, in particular, magnets with anisotropy in a radial direction are endowed with excellent magnetic properties, are freely magnetizable and require no reinforcement to fix the magnet in place as in the case of segment magnets, finding use in AC servomotors, DC brushless motors and other related applications. The trend in recent years toward higher motor performance has brought with it a demand for elongated radially anisotropic magnets.

Figure 2A:
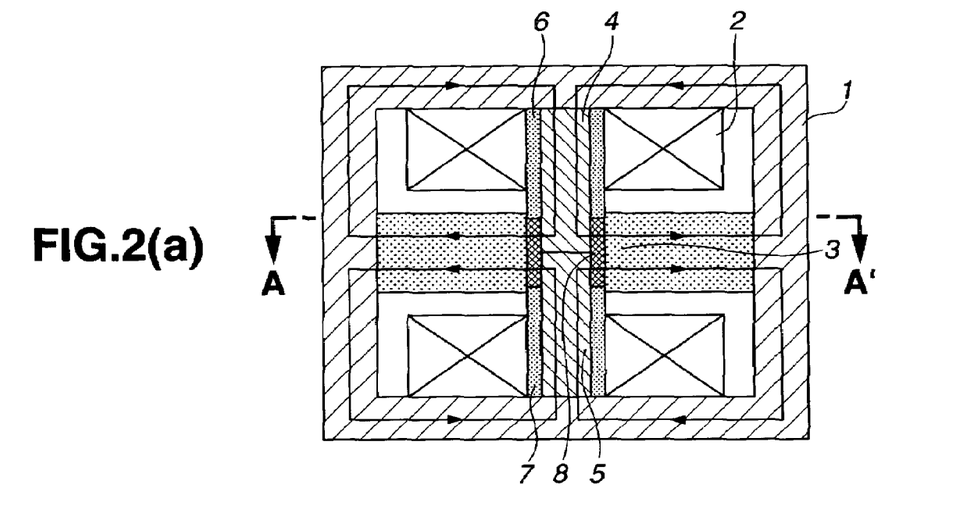
FIG. 2a is an elevational cross-section.
Figure 2B:
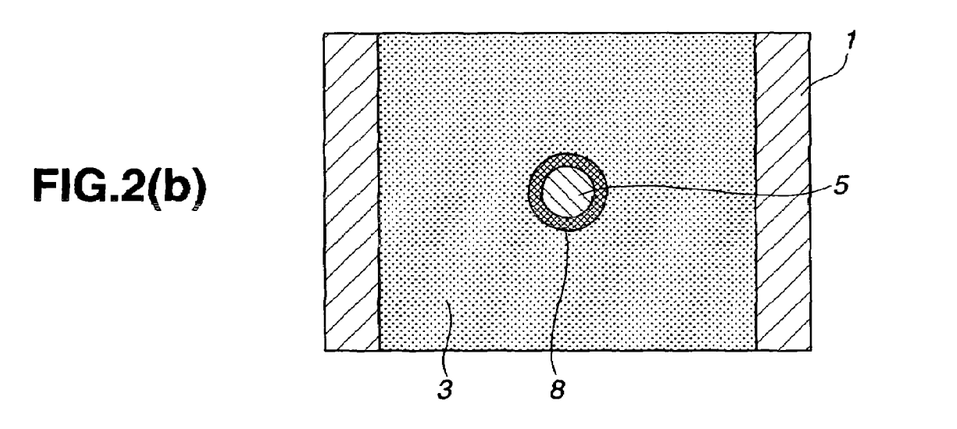

Magnets having a radial orientation are manufactured by vertical compacting in a vertical magnetic field or by backward extrusion. The vertical compacting in vertical magnetic field process is characterized by applying opposing magnetic fields through the core of a mold in the pressing direction so as to provide a radial orientation. That is, as shown in FIG. 2, a magnet powder 8 packed into a mold cavity is radially oriented by coil 2 to generate orienting magnetic fields which are opposed toward each other through cores 4 and 5, to thereby form magnetic circuits that run from the cores 4 and 5 to a die 3 and back to the cores through a compactor frame 1. Also shown in FIG. 2 are a top punch 6 and a bottom punch 7.

Thus, in this vertical compacting in vertical magnetic field apparatus, the magnetic fields generated by the coils create magnetic paths extending from the cores, through the die and the compactor frame and back to the cores. To reduce magnetic field leakage loss, a ferromagnet, typically a ferrous metal is used as the material making up the portions of the compactor that formed the magnetic paths. However, the strength of the magnet powder-orienting magnetic field is determined by the following parameters.

Magnetic fluxes which have passed through the top and bottom cores meet from opposite directions at the core center and divert into the die. The amount of magnetic flux that passes through the core is determined by the saturation flux density of the core. The magnetic flux density of an iron core is about 2.0 T. Therefore, the strength of the orienting magnetic field at inside and outside diameters of a magnet powder packed cavity is obtained by dividing the magnetic flux which has passed through the top and bottom cores by the inside surface area and outside surface area of the magnet powder packed cavity, respectively, as follows:

$$2 \cdot \pi \cdot (B/2)^2 \cdot 20/(\pi \cdot B \cdot L) = 10 \cdot B/L \text{ (inner periphery)};$$

$$2 \cdot \pi \cdot (B/2)^2 \cdot 20/(\pi \cdot A \cdot L) = 10 \cdot B^2/(A \cdot L) \text{ (outer periphery)}$$

wherein B is a core diameter (magnet powder packed cavity inside diameter), A is a die diameter (magnet powder packed cavity outside diameter), and L is a magnet powder packed cavity height. Because the magnetic field is smaller at the outer periphery than at the inner periphery, a magnetic field of at least 10 kOe is required at the outer periphery in order to obtain good orientation in all areas of the magnet powder packed cavity. As a result, $10 \cdot B^2/(A \cdot L) = 10$, and so $L = B^2/A$. Given that the height of the green compact is about one-half the height of the packed powder and is reduced further during sintering to about 80%, the magnet ultimately obtained has a very small height. Because the saturation flux density of the core determines the strength of the orienting magnetic field as mentioned above, the size (i.e., height) of the magnet that can be oriented is dependent on the core shape. It has thus been difficult to manufacture annular magnets that are elongated in their axial direction. In particular, it has been possible to manufacture small-diameter annular magnets only to very short lengths.

The backward extrusion process for manufacturing radially oriented magnets is not effective to the production of low-cost magnets because it requires the use of large equipment and has a poor yield.

Thus, regardless of which method is used, radially anisotropic magnets are difficult to manufacture. The inability to achieve the low-cost, large-volume production of such magnets has in turn made motors that use radially anisotropic magnets very expensive to manufacture.

In the event radially anisotropic ring magnets are produced as sintered magnets, as a result of anisotropy imparted, unwanted fracture and cracking can occur in the magnet during the sintering and aging/cooling steps, if the stress generated in the magnet due to a difference in coefficient of linear expansion between a c-axis direction and a direction perpendicular to c-axis is greater than the mechanical strength of the magnet. For this reason, R—Fe—B base sintered magnets could be manufactured only to a magnet shape having an inner/outer diameter ratio of at least 0.6 (see Hitachi Metals Technical Report, Vol. 6, pp. 33-36). Further, in the case of R—(Fe,Co)—B base sintered magnets, cobalt that has substituted for iron is not only contained in the primary 2-14-1 phase in the alloy structure, but also forms $R_3Co$ in an R-rich phase, reducing mechanical strength noticeably. Due to a high Curie temperature, in addition, there occur greater changes in coefficient of thermal expansion in a c-axis direction and a direction perpendicular to c-axis during the cooling step from the Curie temperature to room temperature, resulting in an increased residual stress which causes fracture and cracking. For this reason, R—(Fe,Co)—B base radially anisotropic ring magnets are given still stricter shape limits than cobalt-free R—Fe—B base magnets, so that stable magnet manufacture is possible only with a shape having an inner/outer diameter ratio of at least 0.9. The problem becomes serious particularly in the case of small-diameter radial magnets since they have a low inner/outer diameter ratio despite a thickness. For the same reason, ferrite magnets and Sm—Co base magnets suffer fracture and cracking, prohibiting their stable manufacture.

The circumferential residual stress, associated with radial anisotropy imparted, which causes fracture or cracking to occur during the sintering and aging/cooling steps is discussed in the report of Kools' study relating to ferrite magnets (F. Kools, Science of Ceramics, Vol. 7 (1973), pp. 29-45) and expressed by equation (1).

$$\sigma_\theta = \Delta T \Delta \alpha E K^2/(1-K^2) \cdot (K\beta_K \eta^{K-1} - K\beta_{-K} \eta^{-K-1}) \quad (1)$$

$\sigma_\theta$: circumferential stress $\Delta T$: temperature difference $\Delta \alpha$: difference in coefficient of linear expansion $(\alpha \| - \alpha \perp)$ E: Young's modulus in orienting direction $K^2$: anisotropic ratio of Young's modulus ($E\perp/E\|$)

η: position (r/outer diameter)
$\beta_k$: $(1-\rho^{1+K})/(1-\rho^{2K})$
ρ: inner diameter/outer diameter ratio In the above equation, the item having the largest impact on the cause of fracture or cracking is Δα, i.e., difference in coefficient of linear expansion (α∥−α⊥). For ferrite magnets, Sm—Co base rare earth magnets and Nd—Fe—B base rare earth magnets, the difference in coefficient of thermal expansion between different crystal directions (i.e., anisotropy of thermal expansion) develops from the Curie temperature and increases as the temperature lowers during the cooling step. At this stage, the residual stress increases beyond the mechanical strength of magnet, resulting in fracture.

The stress due to the difference in thermal expansion between the orientation direction and a direction perpendicular thereto, as given by the above equation, develops as an annular magnet is radially oriented over its entire circumference. Therefore, if an annular magnet including a portion which is oriented differently from the radial orientation is produced, the occurrence of fracture is suppressed. For example, annular magnets which are prepared by the vertical compacting in horizontal magnetic field process so that they are oriented in one direction perpendicular to the annular axis do not fracture regardless of whether they are Sm—Co base rare earth magnets or Nd—Fe(Co)—B base rare earth magnets.

Fracture occurs just because of radial orientation. In a method generally taken for radial magnets for preventing fracture, the radial orientation of a radial magnet is disordered so as to reduce the difference between thermal expansion in c-axis direction and thermal expansion in a direction perpendicular thereto. This method, however, reduces the magnetic flux from the magnet serving as a torque source for a motor, failing to construct high-performance motors.

DISCLOSURE OF THE INVENTION

Problem to be Solved by the Invention

An object of the present invention, which has been made in view of the above-discussed circumstances, is to provide a radially anisotropic annular sintered magnet which undergoes neither fracture nor cracking during the sintering and aging/cooling steps even when it is shaped to a low inner/outer diameter ratio and which has satisfactory magnetic properties; and an inexpensive, high-performance permanent magnet motor comprising the radially anisotropic annular sintered magnet.

Means for Solving the Problem

The present invention that achieves the above objects provides a radially anisotropic sintered magnet of annular shape having a remanence (or residual magnetic flux density), in which the remanence in a radial direction of the annulus increases and decreases at intervals of 90° in a circumferential direction of the annulus, and the remanence in a radial direction over the entire circumference of the annulus has a maximum of 0.95 to 1.60 T and a minimum equal to 50 to 95% of the maximum.

The remanence of a radially anisotropic annular sintered magnet in a radial direction of the annulus increases and decreases along a circumferential direction of the annulus, introducing intentional disordering of local orientation. There is obtained a radially anisotropic annular sintered magnet, typically a radially anisotropic annular sintered rare earth magnet, which undergoes neither fracture nor cracking during the sintering and aging/cooling steps and has satisfactory magnetic properties, and particularly, a radially anisotropic annular sintered magnet, typically a radially anisotropic annular sintered rare earth magnet, which undergoes neither fracture nor cracking even when it is shaped to a low inner/outer diameter ratio and which has satisfactory magnetic properties.

In a preferred embodiment, the radially anisotropic annular sintered magnet has an inner diameter of up to 90 mm, an outer diameter of up to 100 mm, an inner diameter/outer diameter ratio of at least 0.3, and a height of up to 70 mm.

In another aspect, the invention provides a permanent magnet motor comprising a plurality of stator teeth, wherein the radially anisotropic annular sintered magnet defined above is incorporated after it is magnetized in 4n poles (wherein n is an integer of 1 to 20) so that the boundary between N and S poles is located within the range that is centered at the radial direction where the remanence exhibits the minimum and extends ±10° therefrom in a circumferential direction.

The boundary between N and S poles arranged in a circumferential direction of the annular magnet is located within the range that is centered at the region of disordered orientation where the remanence exhibits the minimum, that is, the radial direction where the remanence exhibits the minimum and that extends ±10° therefrom in a circumferential direction. This can minimize the torque ripple which is detrimental during rotation of the motor and increase the quantity of magnetic flux generated from the N and S poles.

In a preferred embodiment, the magnetization is multi-pole skew magnetization and the skew angle is equal to 1/10 to 2/3 of the angle of one pole in a circumferential direction of the radially anisotropic annular sintered magnet; or the stator tooth is a skew tooth having a skew angle equal to 1/10 to 2/3 of the angle of one pole in a circumferential direction of the radially anisotropic annular sintered magnet. In the skew magnetization, the boundary between N and S poles is preferably located within the range that is centered at the direction where the remanence at the axial center of the annular magnet exhibits the minimum and extends ±10° therefrom in a circumferential direction.

Since the permanent magnet motor is constructed in this way, the variation of flux density between poles is minimized. The permanent magnet motor enables rotation at a high torque and without torque cogging.

BENEFITS OF THE INVENTION

The radially anisotropic annular sintered magnet of the present invention undergoes neither fracture nor cracking during the sintering and aging/cooling steps even when it is shaped to a low inner/outer diameter ratio and has satisfactory magnetic properties. A permanent magnet motor comprising the radially anisotropic annular sintered magnet is inexpensive and of high performance.

BRIEF DESCRIPTION OF THE DRAWINGS

FIG. 1 shows a vertical compacting in horizontal magnetic field apparatus used to manufacture radially anisotropic annular sintered magnets according to the invention.

FIG. 2 shows a prior-art vertical compacting in vertical magnetic field apparatus used to manufacture radially anisotropic annular sintered magnets. FIG. 2b is a cross-sectional view taken along line A-A' in FIG. 2a.

BEST MODE FOR CARRYING OUT THE INVENTION

The radially anisotropic annular sintered magnet of the present invention is such that the remanence (or residual magnetic flux density) in a radial direction of the annulus increases and decreases at intervals of 90° in a circumferential direction of the annulus, and the remanence in a radial direction over the entire circumference of the annulus has a maximum of 0.95 to 1.60 T and a minimum equal to 50 to 95% of the maximum.

The stress represented by the above equation (1) develops in a magnet because it is a radially oriented, circumferentially continuous body, that is, radially anisotropic annular magnet. This suggests that the stress can be reduced by partially alleviating the radial orientation. The radially anisotropic annular sintered magnet of the invention is constructed such that its remanence in a radial direction of the annulus increases and decreases at intervals of 90° in a circumferential direction of the annulus. Specifically, the remanence in a radial direction increases and decreases at four periods over the entire circumference (360°) in a circumferential direction of the annulus. The remanence in a radial direction reaches maximum and minimum, each at four points at intervals of 90°. The region where orientation is disordered or discontinuous is where the remanence in a radial direction exhibits the minimum.

If the regions of disordered orientation are randomly distributed, after magnetization, the regions where the flux density is low are also randomly distributed, which causes torque ripple when incorporated in a motor. In contrast, the radially anisotropic annular sintered magnet of the invention is effective for reducing the torque ripple because the regions where orientation is disordered, that is, remanence is low, are distributed at intervals of 90° in a circumferential direction of the annulus, and so the regions where the magnetic flux quantity is small are periodically distributed at intervals of 90°.

In this case, the region of disordered orientation extends continuously from the top to the bottom of the annulus in an axial direction thereof, and the occurrence of fracture and cracking is thus restrained throughout the axial direction of the annular magnet. It is noted that at the region of disordered orientation, the remanence is low not because this region is oriented in a direction different from the radial direction, but because the magnet particles of which this region is composed are randomly directed. Thus the stress capable of inducing fracture is effectively alleviated. In this case, the region of disordered orientation can exist in a minute volume. Since the regions of disordered orientation, albeit minute, are distributed at four places, their effect of preventing fracture is significant.

In the radially anisotropic annular sintered magnet of the invention, the remanence in a radial direction has a minimum equal to 50 to 95%, preferably 50 to 90% of the maximum. At the region of disordered orientation, the remanence in a radial direction exhibits a minimum. The setting that the minimum of the remanence in a radial direction is equal to or less than 95% of the maximum of the remanence in a radial direction is effective for suppressing fracture and cracking. If the minimum of the remanence in a radial direction is less than 50% of the maximum of the remanence in a radial direction, magnet particles are aligned and oriented in a certain direction other than the radial direction, and the magnetic flux at this region makes a discontinuous change from the magnetic flux of the surrounding region, causing torque ripples. In order for a motor having the magnet incorporated therein to produce an effective torque, the maximum of the remanence in a radial direction over the entire circumference of the annulus is 0.95 to 1.60 T, preferably 0.95 to 1.40 T.

It is preferred that the radially anisotropic annular sintered magnet of the invention have an inner diameter of up to 90 mm, an outer diameter of up to 100 mm, an inner diameter/outer diameter ratio of at least 0.3, and a height of up to 70 mm. If the outer diameter is more than 100 mm and the inner diameter is more than 90 mm, the regions of disordered orientation are sometimes less likely to form and if present, they may be less effective for suppressing fracture and cracking. If the height is more than 70 mm, the degree of disordering of orientation may vary in an axial direction of the annulus, leading to variations in the effect of suppressing fracture and cracking. If the inner diameter/outer diameter ratio is less than 0.3, a too much stress may develop due to the anisotropy of thermal expansion, which is detrimental to the effect of suppressing fracture and cracking. More preferably, the inner diameter is equal to or less than 70 mm, the outer diameter is equal to or less than 80 mm, the inner diameter/outer diameter ratio is equal to or greater than 0.4, and the height is equal to or less than 60 mm. Within these ranges, the inner diameter may be equal to or larger than 0.5 mm, the outer diameter be equal to or larger than 1 mm, the inner diameter/outer diameter ratio be equal to or less than 0.99, and the height be equal to or greater than 0.5 mm. The dimensions are not limited to the ranges described herein.

Described below is the method of preparing the radially anisotropic annular sintered magnet of the invention. The radially anisotropic annular sintered magnet of the invention can be prepared, for example, by using an annular magnet compacting mold in which a core is at least partially made of a ferromagnetic material having a saturation magnetic flux density of at least 0.5 T, charging the mold cavity with a magnet powder, compacting the magnet powder while applying an orienting magnetic field according to the vertical compacting in horizontal magnetic field process, and sintering the resulting green compact.

Figure 1A:
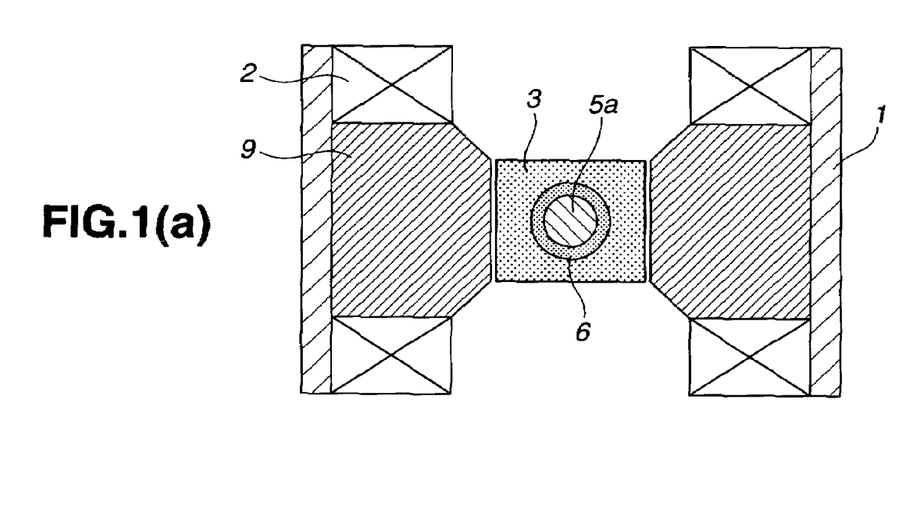
FIG. 1a is a plan view.
Figure 1B:
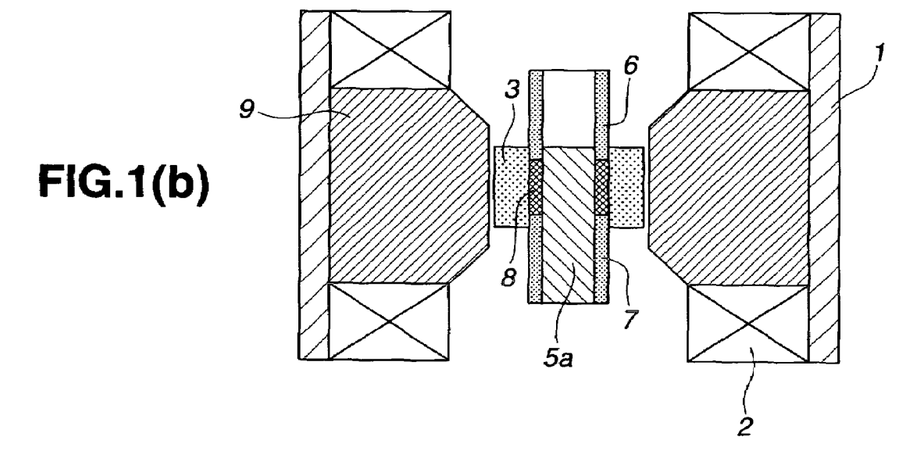
FIG. 1b is an elevational cross-section.

The vertical compacting in horizontal magnetic field apparatus used in this method may be, for example, one illustrated in FIG. 1. FIG. 1 schematically illustrates a vertical compacting in horizontal magnetic field apparatus for carrying out orientation in a magnetic field while compacting into an annular magnet. The vertical compacting in horizontal magnetic field apparatus illustrated is particularly suited for the manufacture of motor magnets. As in FIG. 2, a compactor frame 1, orienting magnetic field-generating coils 2, a die 3, and a core 5a are included in FIG. 1. Also shown are a top punch 6, a bottom punch 7, a packed magnet powder 8, and pole pieces 9.

Herein, a core in an annular magnet compacting mold, typically the core 5a shown in FIG. 1 is at least partially, preferably entirely made of a ferromagnetic material having a saturation magnetic flux density of at least 0.5 T, preferably 0.5 to 2.4 T, more preferably 1.0 to 2.4 T. Suitable core materials include ferromagnetic materials prepared from iron base materials, cobalt base materials and alloy materials thereof.

Figure 3A:
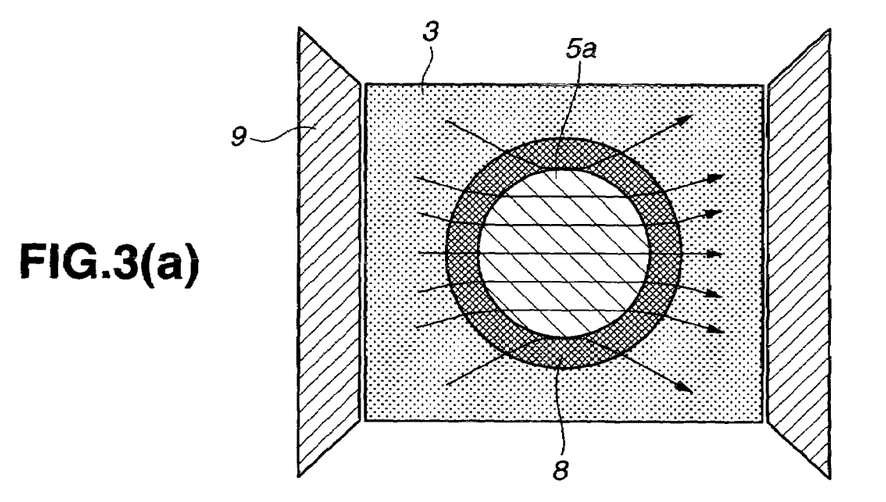
FIG. 3 schematically shows the lines of magnetic force when a magnetic field is generated by the apparatus of FIG. 1 or 2 during the production of a radially anisotropic annular sintered magnet.
Figure 3B:
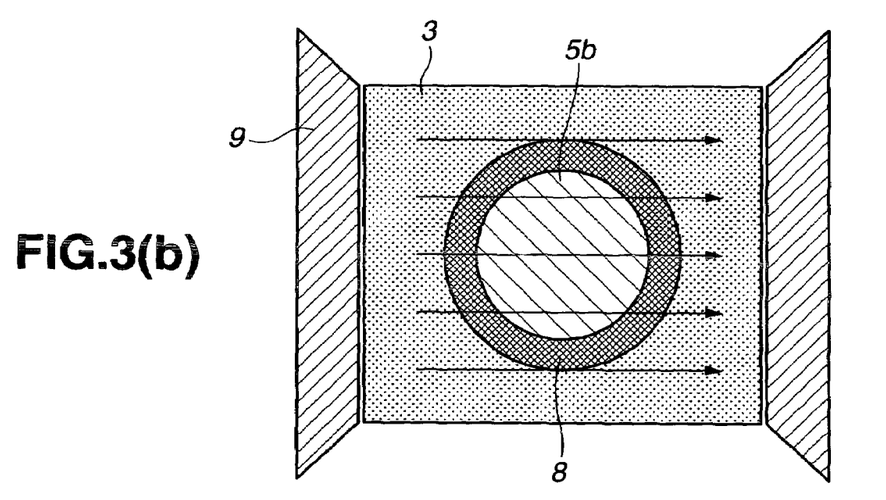
Figures 4A, 4B:
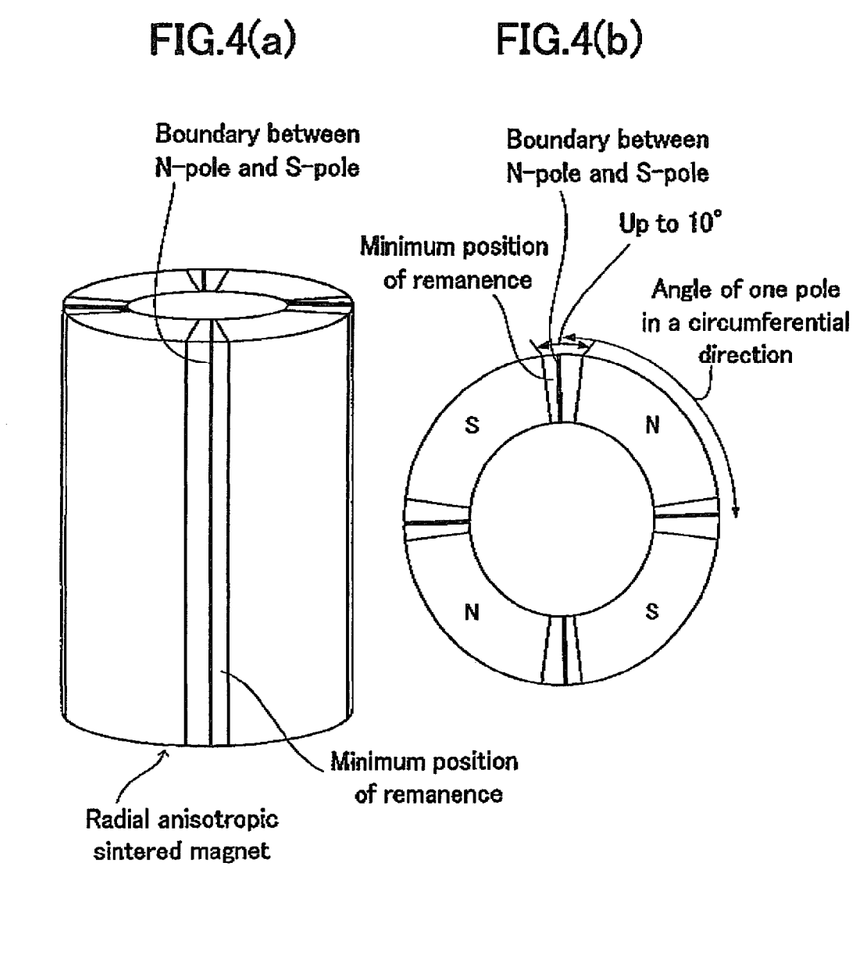
FIGS. 4(a) and 4(b) show an example of a radially anisotropic annular sintered magnet of the present invention.
Figure 4C:
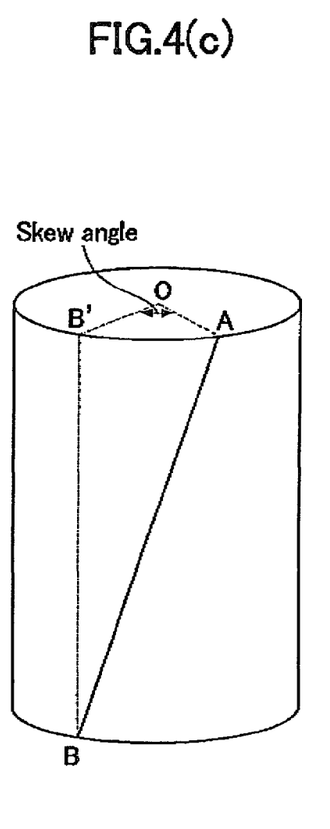
FIG. 4(c) shows a skew angle of the magnet.
Figures 5A, 5B:
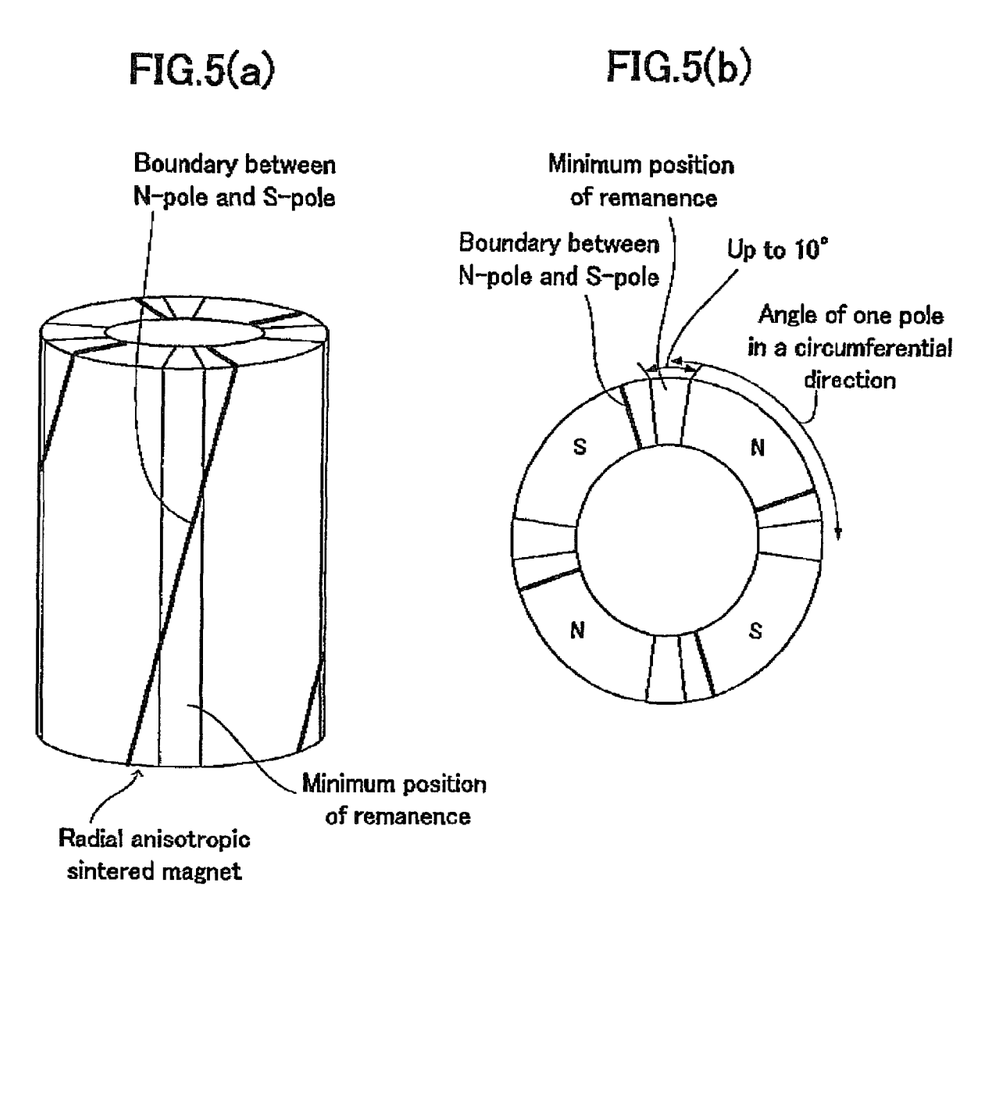
FIGS. 5(a) and 5(b) and FIGS. 6(a) and 6(b) show other examples of radially anisotropic annular sintered magnet of the present invention.
Figure 6A:
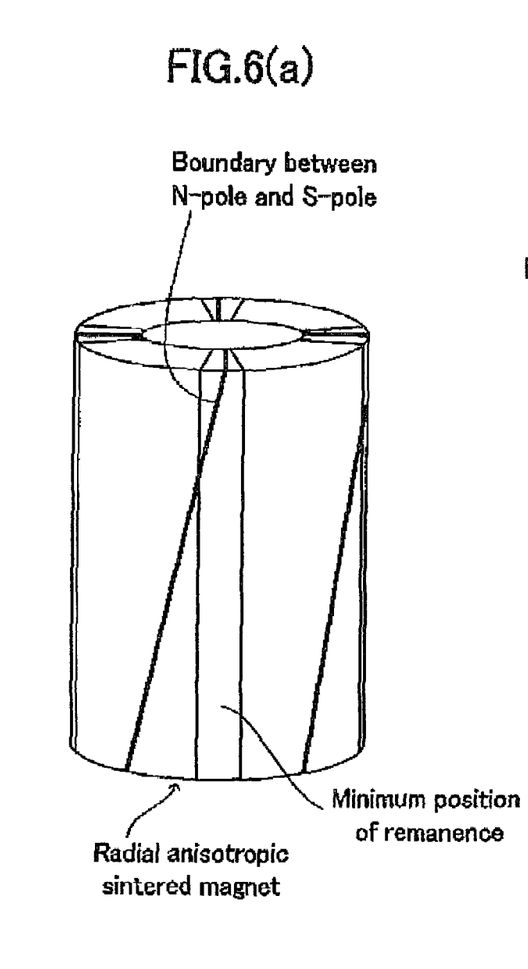
Figure 6B:
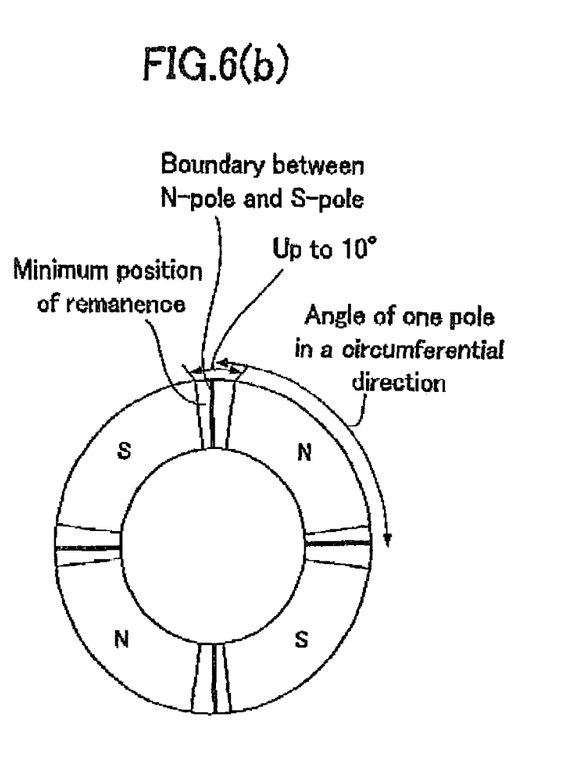
Figure 7A:
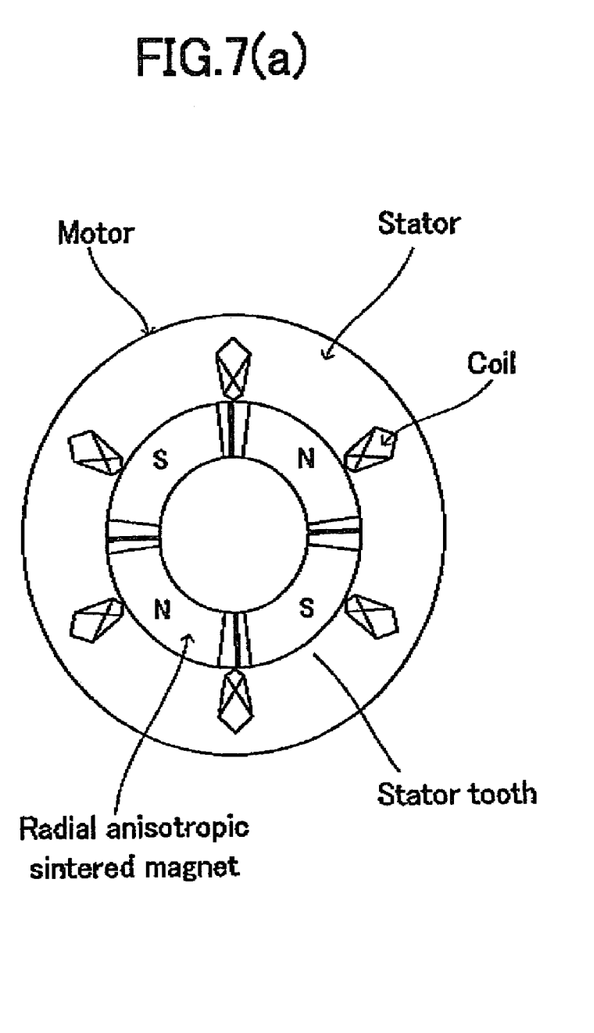
FIG. 7(a) shows an example of a permanent magnet motor of the present invention.
Figure 7B:
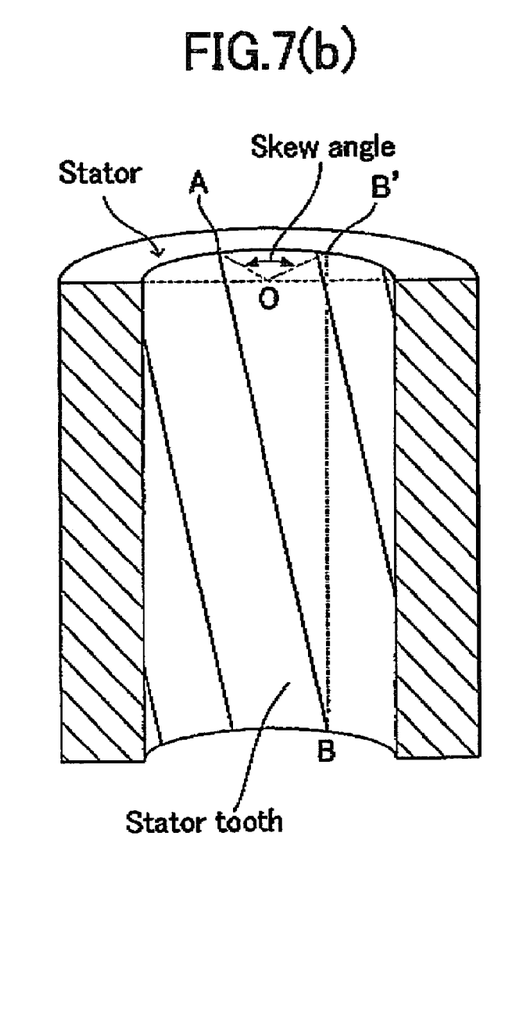
FIG. 7(b) shows a skew angle of the stator tooth.

If a core 5b in FIG. 3b is entirely made of a material which is either nonmagnetic or has a saturation magnetic flux density comparable to that of the magnet powder, the lines of magnetic force extend parallel to each other as shown in FIG. 3b. They are directed in the radial direction near the center in the diagram (central area in a horizontal direction of the applied magnetic field), but as they move upward or downward (opposite sides in a horizontal direction of the applied magnetic field), they merely extend in the direction of the orienting magnetic field created by the coils.

In contrast, in an embodiment wherein a ferromagnet having a saturation magnetic flux density of at least 0.5 T is used in the core, when an orienting magnetic field is applied to a magnet powder, the magnetic flux tends to enter the ferromagnet perpendicularly, creating lines of magnetic force that are nearly radial. Thus, the direction of the magnetic field in the magnet powder packed cavity can be approximate to a radial orientation as shown in FIG. 3a.

Even when the core is made of a ferromagnetic material, it is readily saturated if it has a saturation flux density of less than 0.5 T. In such cases, in spite of the use of a ferromagnetic core, the magnetic field will become close to the state shown in FIG. 3b, failing to achieve effective radial orientation. In addition, a saturation flux density of less than 0.5 T for the core is equal to the saturation flux density (=saturation flux density of magnet×packing density) of the packed magnet powder, and the directions of magnetic flux within the packed magnet powder and the ferromagnetic core thus become the same as the direction of the magnetic field generated by the coils. It is understood that the use of a ferromagnetic material having a saturation flux density of at least 0.5 T as part of the core can provide the above-described effect, although it is preferred for greater effects that the entire core be made of a ferromagnetic material.

In the method of preparing the radially anisotropic annular sintered magnet, magnetic fields are preferably applied by at least one of operations (i) to (iii) of: (i) once applying a magnetic field, rotating the magnet powder an angle of 90° in a circumferential direction of the mold, and then applying a magnetic field again; (ii) once applying a magnetic field, rotating the magnetic field-generating coils an angle of 90° in a circumferential direction of the mold and relative to the magnet powder, and then applying a magnetic field again; and (iii) disposing two sets of magnetic field-generating coil pairs so as to surround the periphery of a mold and such that the directions of applied magnetic fields associated with the coil pairs are orthogonal with each other, applying a magnetic field with one coil pair, and then applying a magnetic field with the other coil pair.

On use of the vertical compacting in horizontal magnetic field apparatus, a magnetic field is first applied to provide a state as shown in FIG. 3a. The packed magnet powder is thus oriented in the direction of the applied magnetic field in the central region of the annulus as viewed in the direction of the applied magnetic field and the regions overlapping the opposite sides of the direction of the applied magnetic field and nearly radially in other regions.

Next, the packed magnet powder is rotated an angle of 90° relative to the direction of the first applied magnetic field in a horizontal direction (an end face direction of the annulus), or the magnetic field-generating coils are rotated an angle of 90° relative to the packed magnet powder in a horizontal direction, before a magnetic field is applied again. Alternatively, provided that two sets of magnetic field-generating coil pairs are previously disposed so as to surround the periphery of a mold and such that the directions of applied magnetic fields associated with the coil pairs are orthogonal with each other, the other coil pair is generated to apply a magnetic field whose direction is orthogonal to the direction of the first applied magnetic field associated with the one coil pair. That is, a magnetic field is applied in a direction orthogonal to the direction of the first applied magnetic field in an end face direction of the annulus.

The subsequent application of a magnetic field is to apply a magnetic field in a radial direction in regions other than the central region of the annulus as viewed in the direction of the applied magnetic field and the regions overlapping the opposite sides of the direction of the applied magnetic field, increasing the degree of radial orientation. On the other hand, in the central region of the annulus as viewed in the direction of the applied magnetic field and the regions overlapping the opposite sides of the direction of the applied magnetic field, a magnetic field is applied perpendicular to the orienting direction of the first applied magnetic field, but not all magnet particles in these regions are reoriented in the direction of the newly applied magnetic field. As a result, magnet particles of which the magnet is composed are randomly oriented.

Greater effects are achieved by conducting plural times the operation of first applying a magnetic field in one direction and then applying a magnetic field in a direction orthogonal to the direction of the first applied magnetic field. When the operation is repeated plural times, it is also effective to reverse the magnetic field-applying direction and apply a magnetic field from the reverse direction.

It is preferred to repeat 2 to 10 times the above operation for the reason that the tendency becomes more prominent as the operation is repeated and that the region having a lower remanence is reduced to a narrower area relative to the entire circumference of the annulus as the number of repetition increases. The region having a lower remanence can be made narrower as the inner/outer diameter ratio of the annulus is lower and as the diameter of the annulus is smaller. However, a larger number of repetition leads to a longer cycle time of shaping, detracting from productivity. The preferred number of repetition is 3 to 10 times, and more preferably 3 to 7 times.

The radially anisotropic annular sintered magnet of the invention can be obtained by applying a magnetic field to magnetic powder for orientation by a method as described above, then compacting the powder in a pressure range of 50 to 2,000 kgf/cm² (about 4.9 to 196 MPa) like the ordinary vertical compacting in horizontal magnetic field process, sintering the green compact in vacuum or an inert gas atmosphere at 1,000 to 1,200° C. The sintered body is optionally subjected to such operations as aging treatment and machining to give a sintered magnet. The invention enables magnets of the desired axial length to be obtained by a single powder feeding operation and a single pressing operation although more than one pressing operation may be employed to produce such magnets.

It is preferred that the vertical compacting in horizontal magnetic field apparatus generate a magnetic field of 0.5 to 12 kOe during the compacting described above. The magnetic field generated by the vertical compacting in horizontal magnetic field apparatus is determined to this range for the reason that if the magnetic field is stronger, the core 5a in FIG. 3a may become saturated and assume a state close to that shown in FIG. 3b, failing to achieve radial orientation. It is thus preferable for the magnetic field to have a strength of equal to or less than 12 kOe, especially equal to or less than 10 kOe. Also, when a ferromagnetic core is used, the magnetic flux concentrates in the core, creating a magnetic field which, in the vicinity of the core, is stronger than the magnetic field generated by the coils. However, if the orienting magnetic field is too weak, a magnetic field sufficient for orientation will not be available even in the vicinity of the core. It is thus preferable for the magnetic field to have a strength of at least 0.5 kOe, especially at least 1 kOe. Since the magnetic flux concentrates in the vicinity of the ferromagnet to create a stronger magnetic field thereat as just noted, the phrase "magnetic field generated by the vertical compacting in horizontal magnetic field apparatus" refers herein to the intensity of magnetic field in places at a sufficient remove front the ferromagnet, or to magnetic field values measured in the absence of the ferromagnetic core.

The magnetic field to be applied to the magnet powder during one operation selected from operations (i) to (iii) immediately before compaction or during compaction preferably has a strength of $1.25 \times 10^5/\pi$ to $2 \times 10^6/\pi$ A/m (0.5 to 8 kOe), more preferably $2.5 \times 10^5/\pi$ to $1.25 \times 10^6/\pi$ A/m (1 to 5 kOe). After a magnetic field is applied to the packed magnet powder, a magnetic field is applied again in a direction orthogonal to the direction of the first applied magnetic field in an end face direction of the annulus. If the subsequent magnetic field has a strength of more than $2 \times 10^6/\pi$ A/m (8 kOe), it becomes difficult to maintain the orientation given by the first applied magnetic field, and the magnetic field can be unnecessarily applied to the regions that have already acquired the desired orientation. On the other hand, at a strength of less than $1.25 \times 10^5/\pi$ A/m (0.5 kOe), the magnetic field may be too weak to achieve the orientation-improving effect by magnetic field application, failing to gain any orientation improvement.

The magnet powder used herein is not particularly limited. Use may be made of source magnet powders for ferrite magnets, Sm—Co base rare-earth magnets and various types of bonded magnets as well as Nd—Fe—B base magnets. In any case, an alloy powder having an average particle size of 0.1 to 10 μm, and especially 1 to 8 μm is preferred.

Next, the permanent magnet motor of the invention is described. The permanent magnet motor of the invention comprises a plurality of stator teeth. The radially anisotropic annular sintered magnet of the invention is incorporated after it is magnetized in 4n poles (wherein n is an integer of 1 to 20) so that the boundary between N and S poles is located within the range that is centered at the radial direction where the remanence exhibits the minimum and extends ±10° therefrom in a circumferential direction.

In this embodiment, the magnet is magnetized so that the boundary between N and S poles is located within the range, including the aforementioned four regions of disordered orientation, that is centered at the radial direction where the remanence exhibits the minimum and extends ±10° in a circumferential direction. As a result, those regions of less magnetic flux do not appear on the poles, and the poles have a magnetic flux density which is higher and uniform. There is obtained a multi-pole annular magnet suited for a permanent magnet motor, that can eliminate any cogging or degradation of motor torque.

The permanent magnet motor of the invention may be arrived at by incorporating the multi-pole annular magnet as a rotor in a motor, especially a motor having a plurality of stator teeth. The motor having stator teeth may be of the well-known structure.

As compared with a conventional radially anisotropic annular sintered magnet which has been magnetized in multiple poles, the radially anisotropic annular sintered magnet of the invention which has been magnetized in multiple poles is low in magnetizability and magnetic properties in the vicinity of pole-to-pole boundary and thus provides a smooth transition of magnetic flux density between poles, leading to a motor with a sufficiently low cogging torque. The cogging torque can be further reduced by effecting skew magnetization or skewing the stator teeth.

The skew angle of the radially anisotropic annular sintered magnet or stator teeth is preferably equal to 1/10 to 2/3, more preferably 1/10 to 2/5 of the angle of one pole in a circumferential direction of the radially anisotropic annular sintered magnet because the effect of skew magnetization for reducing cogging torque is less observable if the skew angle is less than 1/10 of the angle of one pole in a circumferential direction of the magnet, and the motor torque is substantially reduced if the skew angle is more than 2/3 of the angle of one pole.

Otherwise, the permanent magnet motor of the invention may be of the well-known structure.

EXAMPLE

Examples, Comparative Example and Reference Example are given below for further illustrating the invention although the invention is not limited thereto.

Example 1

By using Nd, Dy, Fe, Co, Al and Cu, each of 99.7 wt % purity, and B of 99.5 wt % purity, melting them in a vacuum melting furnace, and casting the melt, an ingot of $Nd_{29}Dy_{2.5}Fe_{64.2}Co_3B_1Al_{0.2}Cu_{0.1}$ alloy was prepared. The ingot was crushed on a jaw crusher and a Brown mill, and milled on a jet mill in a nitrogen stream, obtaining a fine powder (magnet powder) having an average particle size of 3.5 μm.

Using a vertical compacting in horizontal magnetic field apparatus as shown in FIG. 1 having mounted a ferromagnetic core (S50C: Fe steel) having a saturation magnetic flux density of 2.0 T, a series of operations were carried out on the fine powder.

(1) A magnetic field of 10 kOe was applied from one horizontal direction for orienting the packed magnet powder and in the same status (without rotation), a magnetic field of 5 kOe was applied from a direction opposite to the one horizontal direction. This is first magnetic field application.

(2) The packed magnet powder was rotated an angle of 90° in a horizontal direction together with the punches, core and die. A magnetic field of 10 kOe was applied from the same one horizontal direction as in the first magnetic field application and a magnetic field of 5 kOe applied from an opposite direction. This is second magnetic field application.

(3) As in the second magnetic field application, the packed magnet powder was further rotated an angle of 90° in a horizontal direction, after which a magnetic field of 5 kOe was applied from the same one horizontal direction as in the first magnetic field application and a magnetic field of 5 kOe applied from an opposite direction. This operation was repeated four times.

(4) As in the second magnetic field application, the packed magnet powder was further rotated an angle of 90° in a horizontal direction, after which the powder was compacted under a pressure of 500 kgf/cm² while applying a magnetic field of 2 kOe from the same one horizontal direction as in the first magnetic field application. The magnet powder prior to compaction had a packing density of 35%.

Then the green compact was sintered in vacuum at 1,090° C. for one hour and subsequently heat treated at 580° C. for one hour for aging, yielding a rare earth annular sintered magnet having an outer diameter of 10 mm, an inner diameter of 6 mm and a length of 30 mm. From one of the directions of magnetic fields applied during the shaping process which is assumed to be 0°, the remanence Br of the resulting rare earth annular sintered magnet was measured at intervals of 45° in a circumferential direction of the annulus, with the results shown in Table 1. Further, 100 rare earth annular sintered magnet samples were manufactured by the above-described process, with the number of cracked samples being also reported in Table 1.

Comparative Example 1

Using the same magnet powder as in Example 1, a magnet was prepared with a vertical compacting in vertical magnetic field apparatus as shown in FIG. 2. The magnet powder was packed to a height of 5 mm and compacted in a coil-generated magnetic field of 20 kOe. The compact was then moved downward, after which the magnet powder was packed on the green compact again to a height of 5 mm and similarly compacted in a magnetic field. The step of packing the magnet powder to a height of 5 mm and compacting was repeated further 13 times. Thereafter, the green compact was sintered and heat treated for aging under the same conditions as in Example 1, yielding a rare earth annular sintered magnet having an outer diameter of 10 mm, an inner diameter of 6 mm and a length of 30 mm. As in Example 1, the remanence Br was measured and the number of cracked samples counted. The results are shown in Table 1.

cation and a magnetic field of 5 kOe applied from an opposite direction. This is second magnetic field application.

(3) As in the second magnetic field application, the packed magnet powder was further rotated an angle of 90° in a horizontal direction, and the powder was compacted under a pressure of 500 kgf/cm² while applying a magnetic field of 2 kOe from the same one horizontal direction as in the first magnetic field application and then a magnetic field of 2 kOe from an opposite direction.

Then the green compact was sintered in vacuum at 1,090° C. for one hour and subsequently heat treated at 580° C. for one hour for aging, yielding a rare earth annular sintered magnet having an outer diameter of 8.5 mm, an inner diameter of 3.5 mm and a length of 20 mm. The remanence Br of this rare earth annular sintered magnet in total four directions including the direction of magnetic field applied during the compacting process and a direction perpendicular thereto, both positive and negative, exhibited a minimum of 1.06 to 1.10 T in each of these directions. The remanence Br in directions other than the four directions increased and decreased in a circumferential direction of the annulus and became maximum at an intermediate between two adjacent directions among the four directions (i.e., four directions of ±45° and ±135° relative to the direction of magnetic field applied during the compacting process), the maximum having a value of about 1.22 T.

The magnet was machined into a shape having an outer diameter of 8 mm, an inner diameter of 4 mm and a length of 19 mm and magnetized in four poles such that the boundaries between N and S poles were in register with total four direc-

TABLE 1

| | Br (T) | | | | | | | | Number of |
|---|---|---|---|---|---|---|---|---|---|
| | 0° | 45° | 90° | 135° | 180° | 225° | 270° | 315° | cracked samples |
| Example 1 | 1.12 | 1.25 | 1.10 | 1.24 | 1.10 | 1.25 | 1.11 | 1.24 | 0 |
| Comparative Example 1 | 1.09 | 1.11 | 1.13 | 1.09 | 1.13 | 1.08 | 1.10 | 1.10 | 76 |

It is evident that the radially anisotropic annular sintered magnet of Example 1 has satisfactory magnetic properties as demonstrated by a maximum of its remanence Br equal to 1.25 T and undergoes minimal cracking.

Example 2

The same magnet powder as in Example 1 was used and packed to a packing density of 40% relative to the true density of magnet. Using a vertical compacting in horizontal magnetic field apparatus as shown in FIG. 1 having mounted a ferromagnetic core (Permendur: Fe—Co alloy) having a saturation magnetic flux density of 2.25 T, a series of operations were carried out on the magnet powder.

(1) A magnetic field of 9 kOe was applied from one horizontal direction for orienting the packed magnet powder and in the same status (without rotation), a magnetic field of 5 kOe was applied from a direction opposite to the one horizontal direction. This is first magnetic field application.

(2) The packed magnet powder was rotated an angle of 90° in a horizontal direction together with the punches, core and die. A magnetic field of 9 kOe was applied from the same one horizontal direction as in the first magnetic field applitions including the direction of magnetic field applied during the compacting process and a direction perpendicular thereto, both positive and negative (i.e., four directions at which the remanence exhibited minimum). A motor was assembled by incorporating this annular multi-pole magnet as a rotor in a motor having 6 stator teeth. The motor was measured for induction voltage (RMS) and cogging torque (peak-to-peak) at 5 rpm. The results are shown in Table 2.

Example 3

A motor was assembled as in Example 2 except that the magnetization was 30° skew magnetization. It was measured for induction voltage (RMS) and cogging torque (peak-to-peak) at 5 rpm. The results are shown in Table 2.

Example 4

A motor was assembled as in Example 2 except that the stator teeth were subjected to 30° skew magnetization to provide skew teeth. It was measured for induction voltage (RMS) and cogging torque (peak-to-peak) at 5 rpm. The results are shown in Table 2.

Reference Example 1

A motor was assembled as in Example 2 except that the magnet was magnetized in four poles such that the boundary between N and S poles was in register with an intermediate between two adjacent directions among total four directions including the direction of magnetic field applied during the compacting process and a direction perpendicular thereto, both positive and negative (i.e., four directions of ±45° and ±135° relative to the direction of magnetic field applied during the compacting process, where the remanence exhibited maximum). It was measured for induction voltage (RMS) and cogging torque (peak-to-peak) at 5 rpm. The results are shown in Table 2.

TABLE 2

|  | Induction voltage (V/krpm) | Cogging torque (mNm) |
|---|---|---|
| Example 2 | 0.83 | 1.00 |
| Example 3 | 0.78 | 0.35 |
| Example 4 | 0.80 | 0.20 |
| Reference Example 1 | 0.68 | 1.00 |

It is seen that the radially anisotropic annular sintered magnets of Examples 2 to 4 have a very high remanence Br and are suited for high-performance motors. In particular, the motors of Examples 2 to 4 have an induction voltage which is higher by a factor of about 1.2 than the motor of Reference Example 1, indicating that a higher induction voltage is available when the boundaries between N and S poles are in register with the regions of disordered orientation (i.e., four directions where the remanence exhibits minimum) and that a motor using such a radially anisotropic annular sintered magnet becomes a high-performance motor. It is also evident that magnetization and stator skewing is effective for reducing the cogging.

The invention claimed is:

1. A radially anisotropic sintered magnet of annular shape having a remanence, in which the remanence in a radial direction of the annulus increases and decreases at intervals of 90° in a circumferential direction of the annulus, and the remanence in a radial direction over the entire circumference of the annulus has a maximum of 0.95 to 1.60 T and a minimum equal to 50 to 95% of the maximum.

2. The radially anisotropic annular sintered magnet of claim 1, which has an inner diameter of up to 90 mm, an outer diameter of up to 100 mm, an inner diameter/outer diameter ratio of at least 0.3, and a height of up to 70 mm.

3. A permanent magnet motor comprising a plurality of stator teeth, wherein the radially anisotropic annular sintered magnet of claim 1 or 2 is incorporated after it is magnetized in 4n poles (wherein n is an integer of 1 to 20) so that the boundary between N and S poles is located within the range that is centered at the radial direction where the remanence exhibits the minimum and extends ±10° therefrom in a circumferential direction.

4. The permanent magnet motor of claim 3, wherein the magnetization is multi-pole skew magnetization and the skew angle is equal to 1/10 to 2/3 of the angle of one pole in a circumferential direction of the radially anisotropic annular sintered magnet.

5. The permanent magnet motor of claim 3, wherein the stator tooth is a skew tooth having a skew angle equal to 1/10 to 2/3 of the angle of one pole in a circumferential direction of the radially anisotropic annular sintered magnet.

* * * * *